Dec. 15, 1936.  A. L. PARKER  2,064,268
BUFFER FOR FLUID PRESSURE INDICATORS
Filed Dec. 18, 1935
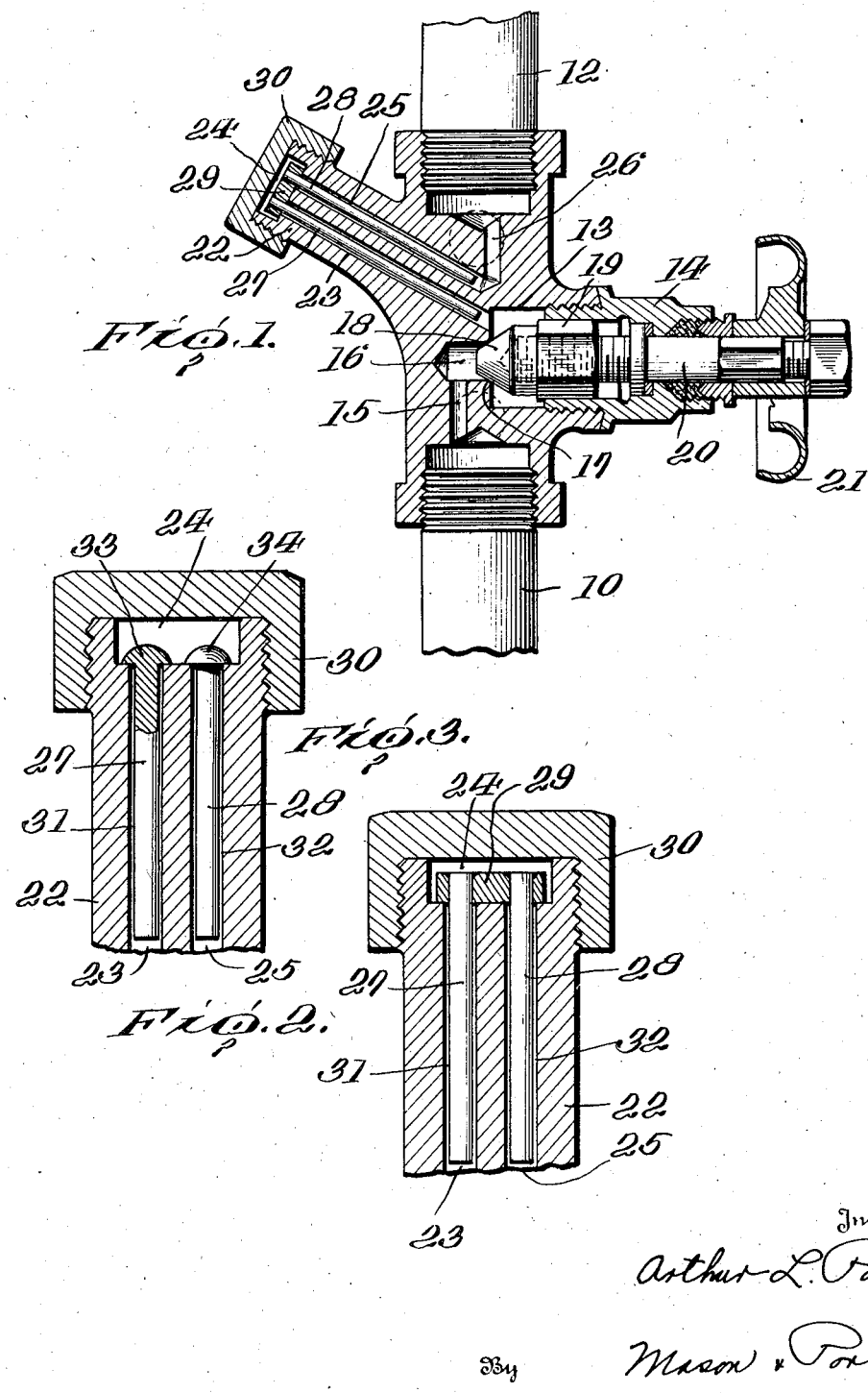

Patented Dec. 15, 1936

2,064,268

UNITED STATES PATENT OFFICE 2,064,268

BUFFER FOR FLUID PRESSURE INDICATORS

Arthur L. Parker, Cleveland, Ohio

Application December 18, 1935, Serial No. 55,103

5 Claims. (Cl. 138—42)

The invention relates to new and useful improvements in a buffer for fluid pressure indicators for preventing the indicator from fluctuating under rapid pulsating changes in the pressure on the line.

An object of the invention is to provide a connection between the indicating device and the pressure line, which connection is so constructed that the walls of the passage leading therethrough will frictionally resist back and forth movements in the fluid incident to rapid pulsating changes in pressure on the fluid while permitting movement of the fluid under gradual changes in pressure.

A further object of the invention is to provide a connection of the above type wherein one of the walls constituting the passage for the fluid is movable so as to prevent the clogging of the passage.

In the drawing—

Figure 1 is a vertical sectional view through a coupling embodying the improvements;

Fig. 2 is an enlarged sectional view of a portion of the coupling showing more clearly the effective buffer passage for the fluid through the coupling, and Fig. 3 is a view similar to Fig. 2, but showing a modified form of supporting means for the rods.

The invention has to do with a buffer for a fluid pressure indicator which may be of any well-known type. Considerable difficulty has been experienced in accurately indicating the average pressure on a fluid pressure line where there are rapid pulsating changes in pressure, due to the fluctuating of the indicator. In order to overcome this difficulty, applicant has provided a coupling which is connected to a pipe leading to the indicator and a pipe leading to the fluid pressure line. This coupling has formed therethrough a bore which is relatively small. Located in the bore is a rod of smaller diameter so as to provide a passage between the outer wall of the rod and the wall of the bore for the fluid. This bore is so positioned that the rod will move by gravity therein. Attached to the upper end of the rod is a head which supports the rod. As shown in the drawing, there are two parallel bores connected at their outer ends and there is a rod in each bore attached to a common supporting head or block. The rod and the bore are so dimensioned as to provide a passage for the fluid which frictionally resists back and forth movements in the fluid incident to rapid fluctuating changes in the pressure on the fluid while permitting movements of the fluid under gradual changes in pressure.

Referring more in detail to the drawing, the pipe 10 is adapted to be connected to a pressure line leading to the fluid transmitting means. This pipe 10 is connected to a coupling 11, and a pipe 12 leading from said coupling is attached to the indicator. The coupling is provided with a recess 13 which is closed at its outer end by a cap 14. There is a port 15 leading to a reduced extension 16 of the recess 13. This provides a valve seat 17 with which a valve 18 is adapted to contact. The valve 18 is carried by a hexagonal sleeve 19 mounted in the cap so that it is held from rotation. This sleeve is threaded and the threaded valve stem 20 engages the sleeve. Said valve stem is turned by means of a handle 21 and as it is rotated in one direction it will force the valve against the seat and close the connection between the recess 13 and the pipe 10. When it is turned in the other direction, then there will be free communication between the pipe 10 and the recess 13.

The coupling is provided with an extension 22. This extension is provided with a bore 23 which leads into the recess 13 and opens at its outer end into a recess 24. As illustrated in the drawing, there is a bore 25 which is parallel with the bore 23 and leads at its upper end into the recess 24 and at its lower end, said bore connects with a port 26 leading to the pipe 12.

Mounted in the bore 23 is a rod 27. Mounted in the bore 25 is a rod 28. As shown, both of these rods are connected to a head or block 29. The rods are connected to this head by welding. It is understood, however, that the rods may be connected in any suitable way to the head, and instead of one single head, two independent heads might be used, as shown in Fig. 3 of the drawing. Threaded on to the outer end of the extension 22 is a cap 30. The recess 24 is so dimensioned that the head and the rods connected thereto are free to move to a limited extent.

It will be noted from the drawing that the rod 27 is so dimensioned relative to the bore 23 as to provide an annular passage 31 for the fluid. Likewise, the rod 28 is so dimensioned relative to the bore 25 as to provide an annular passage 32 for the fluid. Each rod and the bore in which it is located is so dimensioned that the adjacent walls forming this annular passage will frictionally resist back and forth movements in the fluid incident to rapid pulsating changes in the pressure on the fluid. It is well known that whether the transmitting means for the fluid be in the nature of a reciprocating pump or a rotating pump, there is always a rapid pulsating change in the pressure on the line, and it is this rapid change in the pressure that produces fluctuations in the indicator and makes it difficult to indicate accurately the average pressure. When the fluid passage between the pressure line and the indicator is reduced to such an extent that the friction of the wall on the fluid will prevent rapid back and forth movements in the fluid, then the fluctuations of the indicator are avoided. This friction resistance to the rapid movement of the fluid in one direction before the pressure changes so as to move the fluid in the opposite direction, will prevent any movement of the fluid in either direction incident to these rapid changes. However, a gradual change in the pressure on the line will cause the fluid to move in the direction of the change in pressure and this will be properly registered by the indicator.

Let us assume that the valve is closed as indicated in Fig. 1, and then it is opened so that the fluid under pressure passes to the indicator. This will cause the fluid to pass along the annular passage 23 into contact with the head 29 and the fluid will cause the head to move outward in the recess 24. The contact of the fluid against the lower end of the rod 27 also lifts the rod when the pressure increases so as to overcome the action of gravity on the rod which holds it in the position shown in the drawing. When the pressure on the pipe 10 and the pipe 12 reaches a balance, then the gravity acting on the rods will cause them to move downward until the head contacts with the bottom wall of the recess 24. The change in the pressure will, therefore, cause the rods to move back and forth in the bores in which they are located and this will prevent any clogging incident to solid particles in the fluid. When the two bores are placed side by side, as shown in the drawing, the buffer action on the back and forth movements of the fluid extends throughout the length of both of the rods, and there is, therefore, an extended buffer action without unduly extending the size of the coupling member containing the bores. Furthermore, when the bores are placed side by side, as indicated in the drawing, the cap 30 may be readily removed and the rods withdrawn, which gives access to the bores for the cleaning of the same. The valve being disposed between the bore 23 and the pipe 10 connected to the fluid pressure line, when closed, permits the removal of the cap and the cleaning of the bores and parts.

The head to which the rods are attached does not make a perfect fluidtight joint against its seat at the bottom of the recess 24, but it does, to some extent, resist the movement of the fluid, and this is what brings about the slight movement of the assembly of rods tending to scour the passages and prevent clogging. The buffer effect, however, is obtained principally by the fluid friction in the restricted annular passages. This serves to reduce severe gauge pressure fluctuations without materially affecting the proper recording of the average pressure.

In the form shown in Fig. 3, the rod 27 has an integral head 33, while the rod 28 has an integral head 34. These heads are independent of each other, and are sized so as to contact with a seat at the bottom or inner end of the recess 24. These heads are constructed so as to permit the flow of fluid in either direction due to a gradual change in the pressure on the line.

The buffer for the fluid pressure indicator may be used in connection with fluids of all types whether in the form of gas or liquid, and for fluids having different characteristics, the rods may be differently dimensioned relative to the bores in which they are placed so as to produce the desired friction resistance to the back and forth movements of the fluid incident to the rapid pulsating changes in the pressure on the line.

It is obvious that many changes may be made in the details of construction without departing from the spirit of the invention as set forth in the appended claims.

Having thus described the invention, what I claim as new and desire to secure by Letters Patent, is—

1. A buffer for fluid pressure indicators comprising a pipe leading to the indicator, a pipe leading to the pressure line, a coupling joining said pipes, said coupling having an extension with a recess in the outer end thereof, a cap for closing said recess, parallel bores extending along said extension, one of which is connected at its lower end to the pipe leading to the indicator and the other of which is connected at its lower end to the pipe leading to the pressure line, a rod in each bore, means for freely supporting said rods in said bores, said bores being disposed so that the rods will move by gravity in said bores, and said rods being dimensioned relative to said bores so as to provide an annular passage for the fluid which frictionally resists back and forth movements in the fluid incident to rapid pulsating changes in the pressure on the fluid while permitting movement of the fluid under gradual changes in pressure.

2. A buffer for fluid pressure indicators comprising a pipe leading to the indicator, a pipe leading to the pressure line, a coupling joining said pipes, said coupling having an extension with a recess in the outer end thereof, a cap for closing said recess, parallel bores extending along said extension, one of which is connected at its lower end to the pipe leading to the indicator and the other of which is connected at its lower end to the pipe leading to the pressure line, a rod in each bore, a head connecting the upper ends of said rods and disposed in said recess for freely supporting said rods, said rods being dimensioned relative to the respective bores so as to provide an annular passage for the fluid which frictionally resists back and forth movements in the fluid incident to rapid pulsating changes in the pressure on the fluid while permitting movement of the fluid under gradual changes in pressure.

3. A buffer for fluid pressure indicators comprising a pipe leading to the indicator, a pipe leading to the pressure line, a coupling joining said pipes, said coupling having an extension with a recess in the outer end thereof, a cap for closing said recess, parallel bores extending along said extension, one of which is connected at its lower end to the pipe leading to the indicator and the other of which is connected at its lower end to the pipe leading to the pressure line, a rod in each bore, a head connecting the upper ends of said rods and disposed in said recess for freely supporting said rods, said rods being dimensioned relative to the respective bores so as to provide an annular passage for the fluid which frictionally resists back and forth movements in the fluid incident to rapid pulsating changes in the pressure on the fluid while permitting movement of the fluid under gradual changes in pressure, and a valve for closing the passage leading from the bore to the pressure line.

4. A buffer for fluid pressure indicators comprising a pipe leading to the indicator, a pipe leading to the pressure line, a coupling joining said pipes, said coupling having a plurality of small bores communicating with one another and forming a connection between said pipes, a rod located in each of said bores, said bores being disposed so that the rods will move by gravity therein, a head attached to the upper ends of said rods and freely supporting the same in said bores, said rods being dimensioned relative to the bores so as to provide a fluid passage which frictionally resists back and forth movements in the fluid incident to rapid pulsating changes in the pressure on the fluid while permitting movement of the fluid under gradual changes in pressure.

5. A buffer for fluid pressure indicators comprising a pipe leading to the indicator, a pipe leading to the pressure line, a coupling joining said pipes, said coupling having an extension with a closed recess in the outer end thereof, a plurality of bores extending along said extension and communicating with one another through said recess, one of said bores communicating with the pipe leading to the indicator and another of said bores communicating with the pipe leading to the pressure line, a rod in each of said bores, means for freely supporting said rods in said bores, said bores being disposed so that the rods will move by gravity therein, and said rods being dimensioned relative to said bores so as to provide an annular fluid passage which frictionally resists back and forth movements in the fluid incident to rapid pulsating changes in the pressure on the fluid while permitting movement of the fluid under gradual changes in pressure.

ARTHUR L. PARKER.